(12) United States Patent
Nachamiev et al.

(10) Patent No.: US 7,009,534 B2
(45) Date of Patent: Mar. 7, 2006

(54) ISOLATOR FOR CONTROLLED POWER SUPPLY

(76) Inventors: Artur Nachamiev, 36, Pashesh St., Carmiel 20100 (IL); Oleg Boyarko, 15/6, Hativat Golani St., Carmiel 20100 (IL)

(*) Notice: Subject to any disclaimer, the term of this patent is extended or adjusted under 35 U.S.C. 154(b) by 195 days.

(21) Appl. No.: 10/759,995

(22) Filed: Jan. 16, 2004

(65) Prior Publication Data

US 2005/0156583 A1    Jul. 21, 2005

(51) Int. Cl.
*H03M 1/00* (2006.01)

(52) U.S. Cl. ....................................................... 341/110
(58) Field of Classification Search ................ 323/282, 323/283; 341/108, 110, 126, 138, 144, 146, 341/155, 162; 713/300, 320, 330
See application file for complete search history.

(56) References Cited

U.S. PATENT DOCUMENTS

| | | | | |
|---|---|---|---|---|
| 5,490,018 A | * | 2/1996 | Yamashita | 360/32 |
| 5,606,318 A | * | 2/1997 | Feldman | 341/102 |
| 5,835,040 A | * | 11/1998 | Delmas | 341/139 |
| 6,567,025 B1 | * | 5/2003 | Schreier et al. | 341/143 |
| 2004/0258241 A1 | * | 12/2004 | Chang et al. | 380/200 |
| 2005/0104759 A1 | * | 5/2005 | Van Tuijl | 341/144 |

* cited by examiner

*Primary Examiner*—Matthew V. Nguyen
(74) *Attorney, Agent, or Firm*—N Paul Friederichs

(57) ABSTRACT

An isolation circuit for adjustable power system in which the user analog inputs and optional user analog outputs are isolated from the load common potential by discrete value isolators instead of expensive, less accurate, analog isolators. The isolation is achieved by: digitizing the analog signal using analog to digital converter (ADC), transmitting the digital signal through a digital isolator, and converting the isolated digital data back to analog signal using digital to analog converter DAC. Discrete-value opto-couplers or isolation transformers may be used as digital isolators.

20 Claims, 6 Drawing Sheets

*Programming of input and output signals levels.

ISOLATOR FOR CONTROLLED POWER SUPPLY

FIELD OF THE INVENTION

The present invention is related generally to the field of electronic power supply. More particularly, the present invention is related to power supplies in which the working parameters such as voltage or current may be controlled and its controlling analog inputs are isolated.

BACKGROUND OF THE INVENTION

Electronic power supplies are known in the art. There are occasions where it is necessary to adjust some of the working parameters of the power supply such as the output voltage, the supplied current and so on. This is commonly done by applying an analog input signal to the analog input of an adjustable power supply module. For example, an adjustable power supply module capable of supplying voltage up to 100 V will produce its maximum voltage when applying 10 Volts to its analog control input while application of 5 volts to the analog control input will cause the power supply module to produce only 50 Volts. Adjustable power supply module is disclosed in a patent application filed by the inventors of the present invention.

It is sometimes advantageous to electronically isolate the controlling analog input signals from the power supply and load. This is done to protect the low voltage controlling circuits against fluctuations in the common potential used for the load and power supply circuits, fluctuations that may be caused by large ground loop currents or large current or voltage variations that may exist in the load and power supply circuits.

The isolation problem becomes more acute when the controlling system is remote or must control several power supplies. In these systems, it is important to prevent collapse of the controlling system due to a failure of one power supply unit, a failure that might cause the load circuit to transmit voltages or current high enough to damage the controlling system. Isolation requirements of few hundreds to few thousands volts are often requested.

Analog isolators are frequently used for the abovementioned purposes; however, these analog isolators are highly expensive.

Several standards are used to form the relation between the control input signals and the power supply operation, for example: the analog control signal may be applied in the form of current instead of voltage or the analog input signal may be the application of specific resistance between input terminals of the power supply module.

In addition, some power supply modules are equipped with an analog monitoring output for monitoring their operation. For example, it may be useful to monitor the current drawn by the load. A monitoring analog output producing an analog output signal of a voltage proportional to the current drawn by the load may be connected to a display unit for displaying and monitoring the supplied current. For proper isolation, all analog inputs and analog monitoring outputs have to be isolated.

In order to properly adjust and correctly monitor the operation of an adjustable power supply unit, it is necessary to provide the power supply unit with the correct analog control input signals and to be able to translate the analog monitoring output signal for meaningful interpretation of the power supply working parameters. Since several standards and proprietary translation methods are used in the industry, hardware alterations are needed to set up a power supply module for its specific use. Setting up may be done at manufacturing by soldering components (usually resistors) of specific values, or in the field by configuring the system using switches and jumpers to select the desired value among several preinstalled components. These methods limit the flexibly of the system, are time consuming and necessitate manual handling of the system which may be hazardous when done by untrained user.

For example; Xantrex Technology manufactures the XPR series of analog-controlled power supplies for applications including burn-in, electroplating, battery charging, and steering magnets.

Analog control comes standard with the XPR Series as resistive or voltage programming of the supply output voltage and current limits.

Several models are available with voltage ranges of 0–3 up to 0–30 KV and maximum current of 1 A up to 60 KA.

Standards used for analog inputs are set at the factory and selected among: Voltage input of 0–5 V or 0–10 V for full range of the supply output, resistance input of 0–5 k or 0–10 k for full range of the supply output.

Analog monitoring signal proportional to the actual output voltage and current of the power supply is provided using one of two factory-defined standard of 0–5 V or 0–10 V for full range.

It is clear to see that a user analog input signal may produce undesirable supply output if the wrong signaling standard is used.

The series has a straightforward front panel, featuring a seven segment LED display with several status and alarm indicators, and 10-turn knobs for voltage and current control. The front panel buttons allow users to conveniently set and view the over voltage protection set points, view the output voltage and current limits, enable output shutdown, and offer the flexibility of toggling control of the power supply between the front panel and remote analog control.

Lambda EMI, Inc. includes isolation option as add-on card to some of its power supplies, for example the Genesys series. IS510 is a voltage mode isolator with factory preselected range 0–5 or 0–10 V for both input and monitoring channel. IS4200 is a current mode isolator with a range of 4–20 mA for both input and monitoring channel. Both models offer accuracy of +/−1% for the input signals and +/−1.5% accuracy for the monitoring signals.

SUMMARY OF THE INVENTION

It is an object of the present invention to provide an adjustable power system in which the user analog inputs and optional user analog outputs are isolated from the load common potential by discrete value isolators instead of expensive, less accurate analog isolators.

In an embodiment of the current invention, the isolation is achieved by: digitizing the analog signal using analog to digital converter (ADC), transmitting the digital signal through a digital isolator, and converting the isolated digital data back to analog signal using digital to analog converter DAC. Discrete-value opto-couplers or isolation transformers may be used as digital isolators.

The combination of ADC, binary-isolator and DAC (AD-BI-DA) may replace an analog isolator at lower cost and possibly higher performance in various applications, for example controlling power modules such as adjustable power supplies.

In contrast to analog isolators, accuracy of AD-BI-DA systems is limited only by the accuracy of the ADC and DAC used and can easily accede 0.25%. Bandwidth of AD-BI-DA system is limited by the slowest component, and thus may reach speeds of Giga Hertz.

In an embodiment of the invention, an isolated adjustable power system with analog user input line electrically isolated from adjustable power module circuit comprising: at least one user analog input line for receiving user input signal for adjusting working parameter of adjustable power module; at least one analog to digital converter receiving user analog input signal and converting said user signal to digital input information; at least one discrete-value isolator receiving said digital input information from said analog to digital converter and transmitting said isolated information to un-isolated power module side; at least one digital to analog converter receiving isolated digital information from said isolator and producing isolated analog input signal; and at least one adjustable power module capable of adjusting at least one working parameter in response to said analog input.

Optionally, an analog monitoring output of the power system may be isolated using AD-BI-DA channel and provided to the user, isolated from the load common potential.

In another embodiment of the invention, computation power of a micro-controller is added to improve performance and to add flexibility and programmability to the isolated controlling device.

Digital isolator is inserted in order to isolate the user signaling lines from the load common potential. The digital isolator may be inserted between the user and the micro-controller or between the micro-controller and the power module. Both locations of the digital isolator provide separation between the noisy load common potential and the user common potential.

The micro-controller processes the user signals after it was digitized according to its programming and send digital information to the DAC, which provides the adjustable power module with processed analog signals. Similarly, the micro-controller may process digitized information indicative of the performance and status of the power system and use the information for reacting to, or correcting variations in system condition, or provide the user processed information indicative of the system condition.

The program may be pre-installed or field modifiable, allows the micro-controller to flexibly perform functions such as calibration, adaptation to various different signaling standard, assessing and reacting to faults, providing warning and alarms to the user, protection of the power unit and load against faults and errors, etc.

In an embodiment of the current invention, an isolated digital controlling device for controlling adjustable module with user analog input line comprising: at least one user analog input line for receiving user input signal for adjusting a working parameter of adjustable module; at least one analog to digital converter receiving said user analog input signal and converting said user signal to digital input information; at least one discrete-value isolator receiving said digital input information from said analog to digital converter and transmitting said isolated information to a micro-controller; a micro-controller adapted to produce isolated processed digital input information in response to said isolated digital input information; at least one digital to analog converter unit receiving said processed digital input information and producing analog input signal for controlling at least one adjustable module.

Optionally, the isolated digital controlling device, further comprising: at least one analog to digital converter receiving analog monitoring output signal from adjustable module and converting said analog monitoring output signal to digital output information and transmitting said digital output information to micro-controller.

Optionally, the isolated digital controlling device, further comprising: at least one discrete-value isolator receiving processed digital output information from said micro-controller and transmitting isolated processed digital output data to a digital to analog converter; and at least one digital to analog converter receiving said isolated processed digital output data and producing at least one user analog monitoring output signal.

BRIEF DESCRIPTION OF THE FIGURES

In order to better understand the present invention and appreciate its practical applications, the following Figures are attached and references herein. Like components are denoted by like reference numerals.

It should be noted that the figures are given as examples and preferred embodiments only and in no way limit the scope of the present invention as defined in the appending Description and claims.

DETAILED DESCRIPTION OF THE INVENTION AND FIGURES

The following detailed description is of the best presently contemplated modes of carrying out the present invention. This description is not to be taken in a limiting sense, but is made merely for the purpose of illustrating the general principles in accordance with the present invention. The scope of the present invention is best defined by the appended claims.

Figure 1:
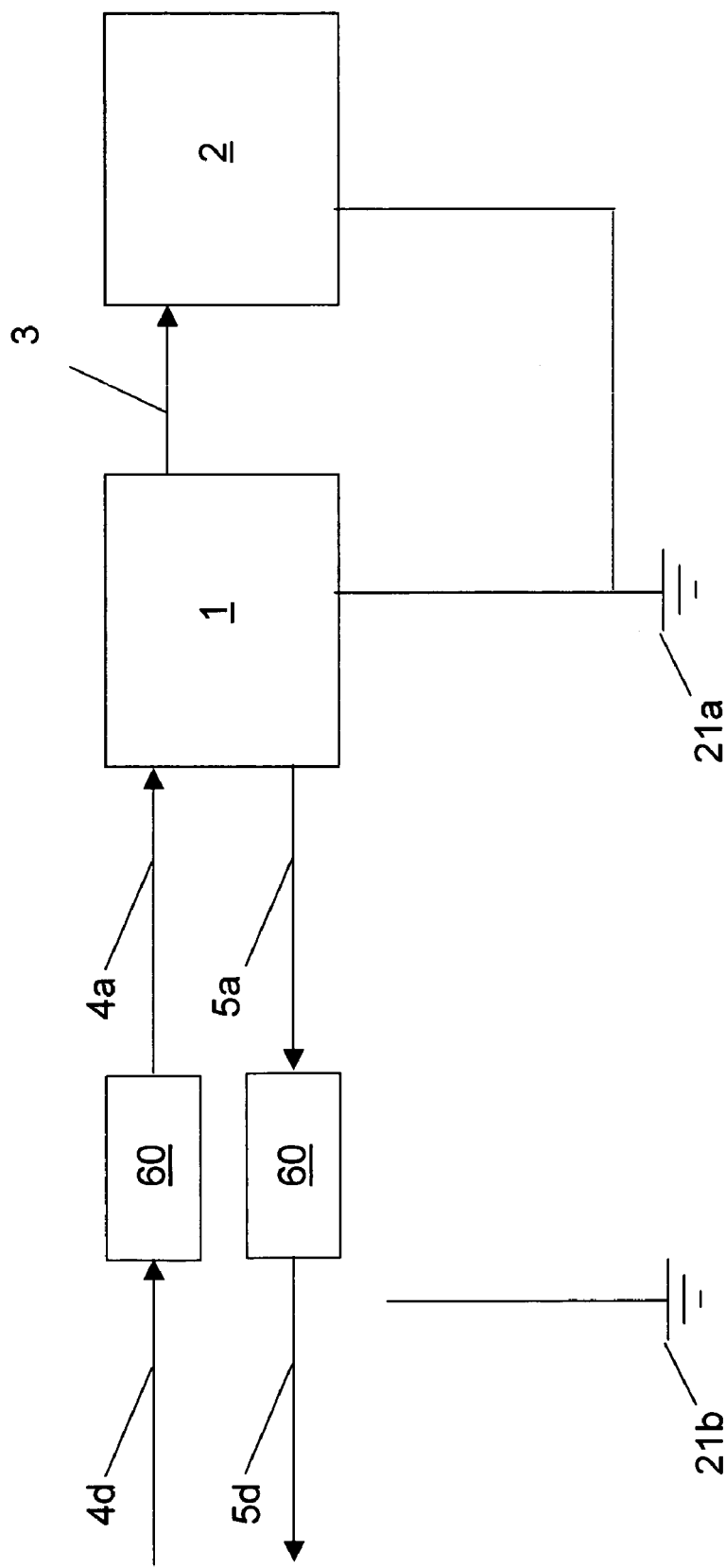
FIG. 1 illustrates a block diagram of an isolated adjustable power supply system as used in the prior art.

Reference is now made to FIG. 1 illustrating a block diagram of an isolated adjustable power system whose analog input line and analog monitoring output lines are electrically isolated as used in the prior art. An adjustable module 1 is connected to the load 2 by power line 3. The adjustable module is commonly an adjustable power supply module used to supply voltage or current to the load. However, adjustable module 1 may be a power-absorbing device used to test the operation of a power-generating load 2 under various working conditions. In some test equipment it is sometime advantageous to use both types of power modules.

An analog input signal applied to an analog input line 4*a* which is used to adjust a working parameter of the module, for example the voltage supplied to the load. The signals in input line 4a are isolated by analog isolator 60 such that the user analog input line 4d is floating in respect to adjustable module 1 and load 2 and is protected against high voltages and ground potential variations.

Optionally, the module is equipped with an analog monitoring output line 5a for monitoring the operation and status of the module. In this case, signals in analog monitoring line 5a are isolated by analog isolator 60 such that user analog monitoring output line 5d is floating in respect to adjustable module 1 and load 2 and is protected against high voltages and ground potential variations.

Figure 2:
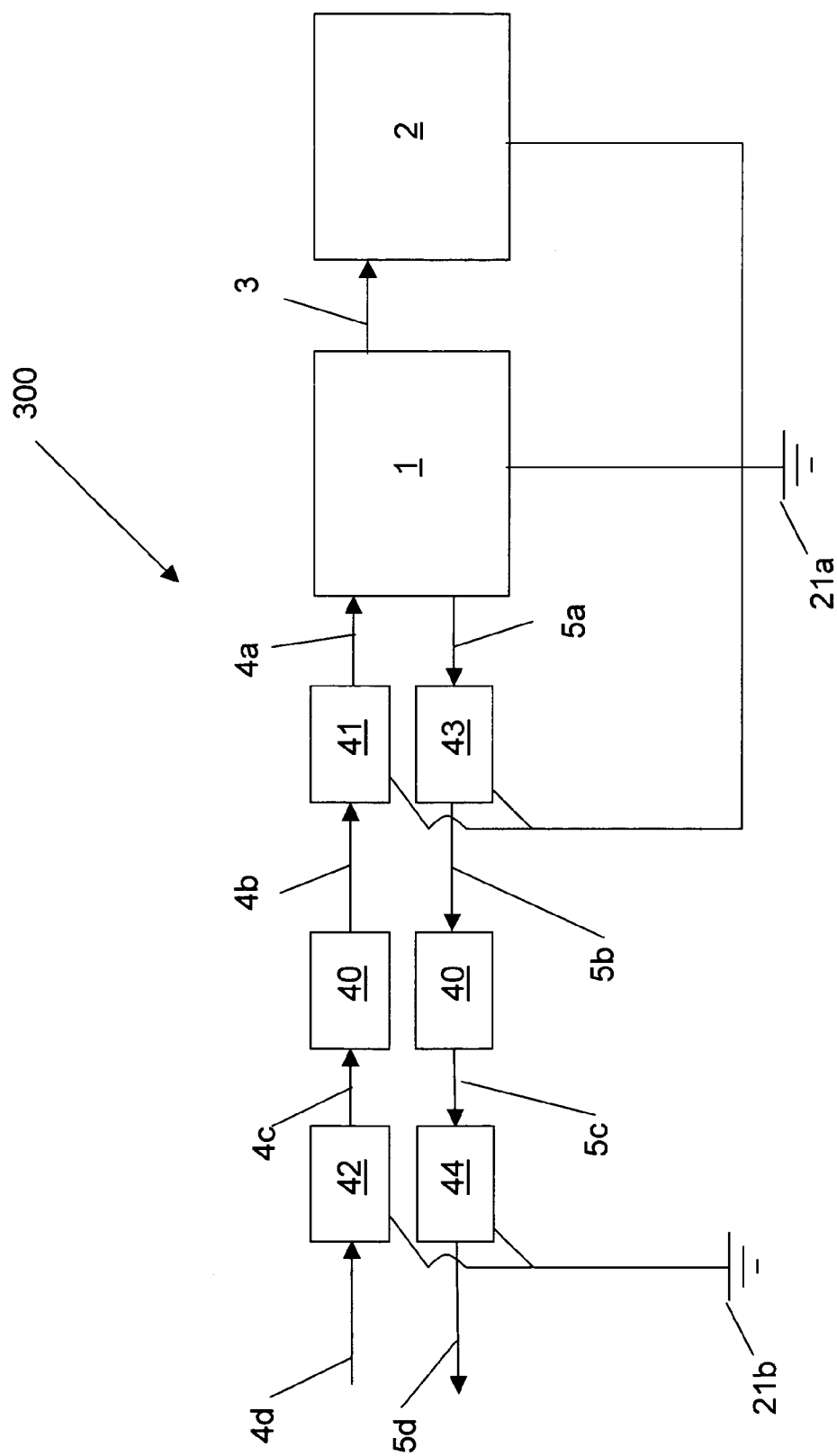
FIG. 2 illustrates a block diagram of an isolated adjustable power system, in accordance of an embodiment of the present invention.

Reference is now made to FIG. 2 illustrating a block diagram of an isolated power system (300) in accordance with an embodiment of the present invention.

An adjustable module 1 is connected to a load 2 by power line 3. Optionally, several power supply lines are used, for example to supply positive and negative voltages as in bipolar power supply module or several voltages as commonly used in mixed analog-digital systems or when several type of loads requires different voltage, current or filtering properties. In this case, all or few or one of the working parameters of the power module is separately adjustable.

At least one analog input signal applied to analog input line 4a which is used to adjust a working parameter of the module for example the voltage supplied to the load. Optionally, several analog input lines are used to adjust the appropriate working parameters of adjustable module 1. Several methods of signaling may be used such as voltage, current, frequency duty-cycle etc.

Optionally, one or more control discrete input lines are used to select mode of operation of the adjustable module, for example the polarity of the output voltage, current mode vs. voltage mode etc. Optionally, control discrete input lines may used to reset a power supply module for example after a fault was detected and corrected. Optionally, several working parameters define the operation of the same power supply output. For example, one analog input signal could adjust the output voltage, the second analog input signal adjust the maximum current a first control signal could define the polarity of the voltage and a second control signal could define the response of the power supply module to current overload.

In the exemplary embodiment of the invention illustrated in FIG. 2, an user analog input signal 4d is first digitized by analog to digital converter (ADC) 42. The digital input information 4c then passes through the discrete-value isolator 40, and the isolated digital input information 4b is converted back into analog form by the digital to analog converter (DAC) 41 and applied to analog input line 4a.

In contrast to analog isolators, discrete-value isolators do not have to preserve the accuracy of the signal to be isolated. In the simplest form—binary data transmitted through the isolator with sufficient accuracy only to determine if the datum was "zero" or "one". Among the methods used for construction of binary isolators are opto-couplers and isolation transformers.

Binary isolators generally can achieve very high bit rate. Thus, the "analog" isolator formed by the combination of ADC 42, discrete-value isolator 40, and DAC 41 have time response limited by the speed of the slowest component in the chain. Similarly, the accuracy of the isolator depends on the accuracy of the ADC and DAC units.

Cost vs. performance considerations guide the choice of components. ADC and DAC units of 10 and 12 bits accuracy are commercially available at low cost, offering accuracy of 1:1,000 or 1:4,000. Higher accuracy can be achieved at higher cost or lower speed. ADC and DAC units of 16 bits or more are commercially available.

The number of binary isolators may be reduced below the number of bits used in the ADC by sending the data in serial form instead of parallel form. When more then one analog signal has to be isolated, the binary data can be interleaved or combined and be separated at the isolated end. These methods may necessitate the use of separate signaling channels for synchronization of the data transfer, selection of DAC etc. It is apparent to a person skilled in the art that the choice of serial transformation of the data reduces the number of isolated channels thus reducing the cost of the discrete level isolator, while parallel transformation may facilitates higher data rate or simpler system architecture.

In opto-coupler isolator, the input signal is used to generate light in a photo-transmitter usually a light emitting diode (LED) or laser diode (LD). The light is channeled to a photo-receiver, usually a photodiode (PD), Avalanche photodiode (APD) or a phototransistor. The light channel may be air gap, transparent plastic or glass large enough to give the desires isolation against high voltage arcing between the photo-transmitter and the photo-receiver and minimize capacitive transmission of noise across the gap. Optionally, a length of optical fiber may be used to transmit light from the photo-transmitter to a photo-receiver. Opto-couplers and other binary isolators are commercially available.

As indicated in FIG. 2, the load common potential 21a is separated from the isolated user common potential 21b used for the isolated analog signal.

To reduce the number of ADCs, few analog signals may be sampled by one ADC using a multiplexer. Similarly, the number of DACs can be reduced.

Control discrete input signals can be isolated with a dedicated discrete-value isolator or can be added to the digital data transmitted serially.

Optionally, the adjustable module is equipped with one or more analog monitoring output lines 5a for monitoring the operation and status of the module. For example, an analog signal proportional to the load current may be used to monitor the load condition. As another example, analog signal may be used to monitor the total power supplied by the power supply module or its temperature or other variables useful to the user. Several methods of signaling may be used such as voltage, current, frequency duty-cycle etc.

Additionally, the module may be equipped with one or more discrete monitoring output lines that indicated the status of the power supply module. For example, if overheating has occurred, which of the power supply line is overloaded, loss of a supply phase in a three-phase supply, etc.

In the exemplary embodiment of the invention illustrated in FIG. 2, analog monitoring output signal 5a is first digitized by Analog to digital converter (ADC) 43. Digital information 5b then passes through the discrete-value isolator 40, and isolated digital information 5c then converted back into analog form by digital to analog converter (DAC) 44 and is available as user monitoring output signal 5d.

As indicated in FIG. 2, load common potential 21a is separated from isolated user common potential 21b used for the isolated analog user signals 4d and optional 5d.

Input and output discrete-value isolators 40 may be combined to reduce the complexity, or reduce the number of components or reduce the cost. For example, one clock signal may be used for synchronization of all digital units (both input and output). In one embodiment of the invention, data is passed serially and bi-directionally using two data isolation channels. Optionally, only one clock generator is used and the clock signal is optionally passed through an isolated channel. Optionally, one or more other binary isolated channels may be used to control the operation of the bi-directional digital isolator and the DAC and ADC units.

Figure 4A:
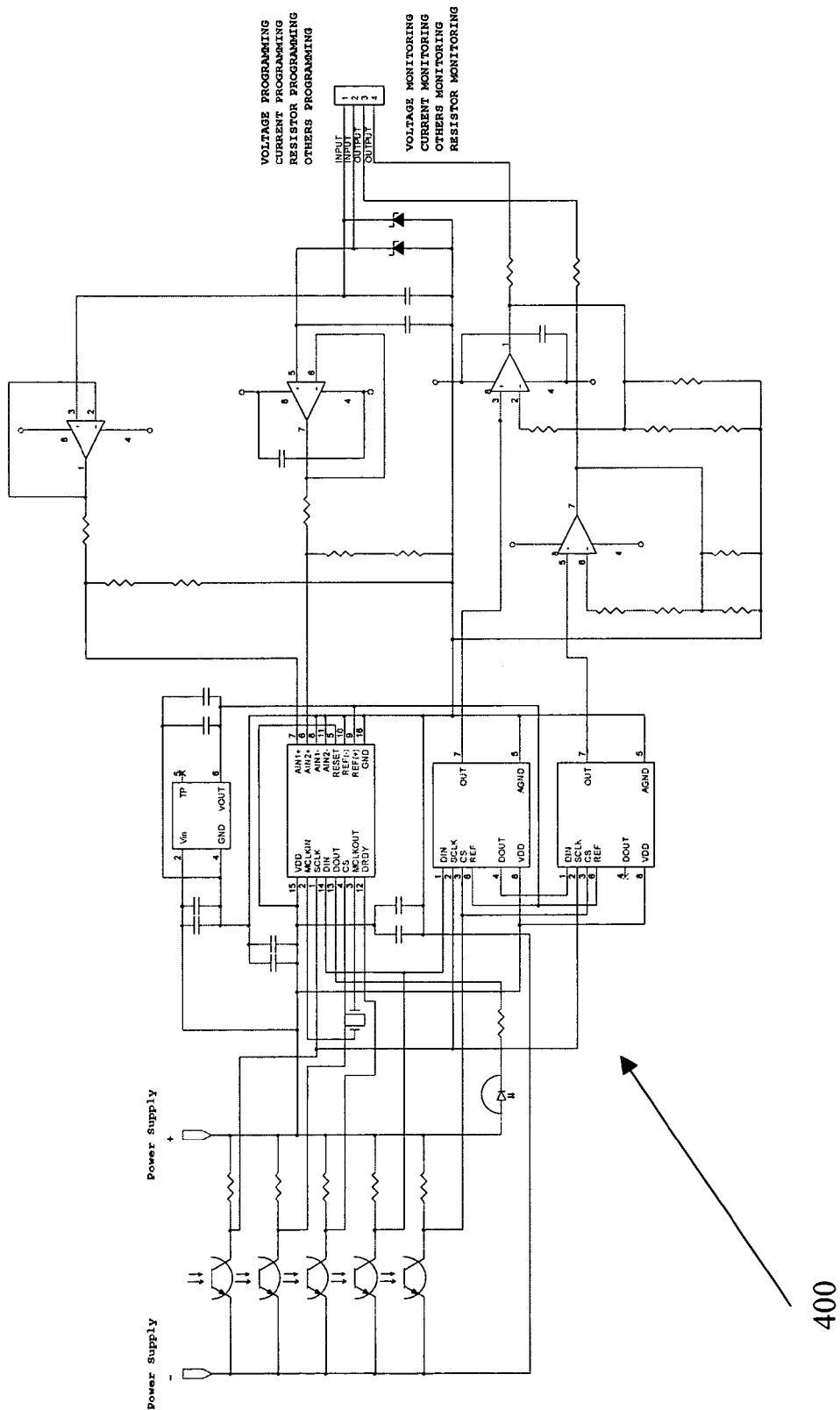
FIG. 4a depict some details of the part which is in the isolated user common potential of the isolation and control device for an isolated, digitally controlled power system in accordance with an embodiment of the present invention.

Optionally, an electronic buffer may be used before an ADC unit or after a DAC unit. An exemplary design for such electronic buffer is shown in FIG. 4a. Optionally, an electronic buffer may be designed to match the requirements of analog input line 4a or to change between bipolar and unipolar values. For example, electronic buffer may be used to boost the voltage of DAC unit or to boost its ability to supply sufficient current to the analog input line 4a. Alternatively, electronic buffer may translate the voltage produced by DAC unit to appropriate current needed to drive a current mode analog input line.

The combination of ADC, binary-isolator and DAC (AD-BI-DA) may replace an analog isolator at lower cost and possibly higher performance in applications other then controlling power modules.

It should be noted that a bi-directional AD-BI-DA system with suitable number of channel may be packaged and sold separately to be combined with an adjustable power module in a way that is transparent to the user. Alternatively, isolated power supply system 300 may be integrated and sold as a unit.

Due to existence of large variety of adjustable modules and the large variety of input signal that are required to control them and large variety of output signal that are required to monitor them, it is sometimes advantageous to construct an isolated digital power supply controlling device to interface between the user and the adjustable power supply module, while maintaining electrical isolation between the user electronics and the load circuit.

Figure 3:
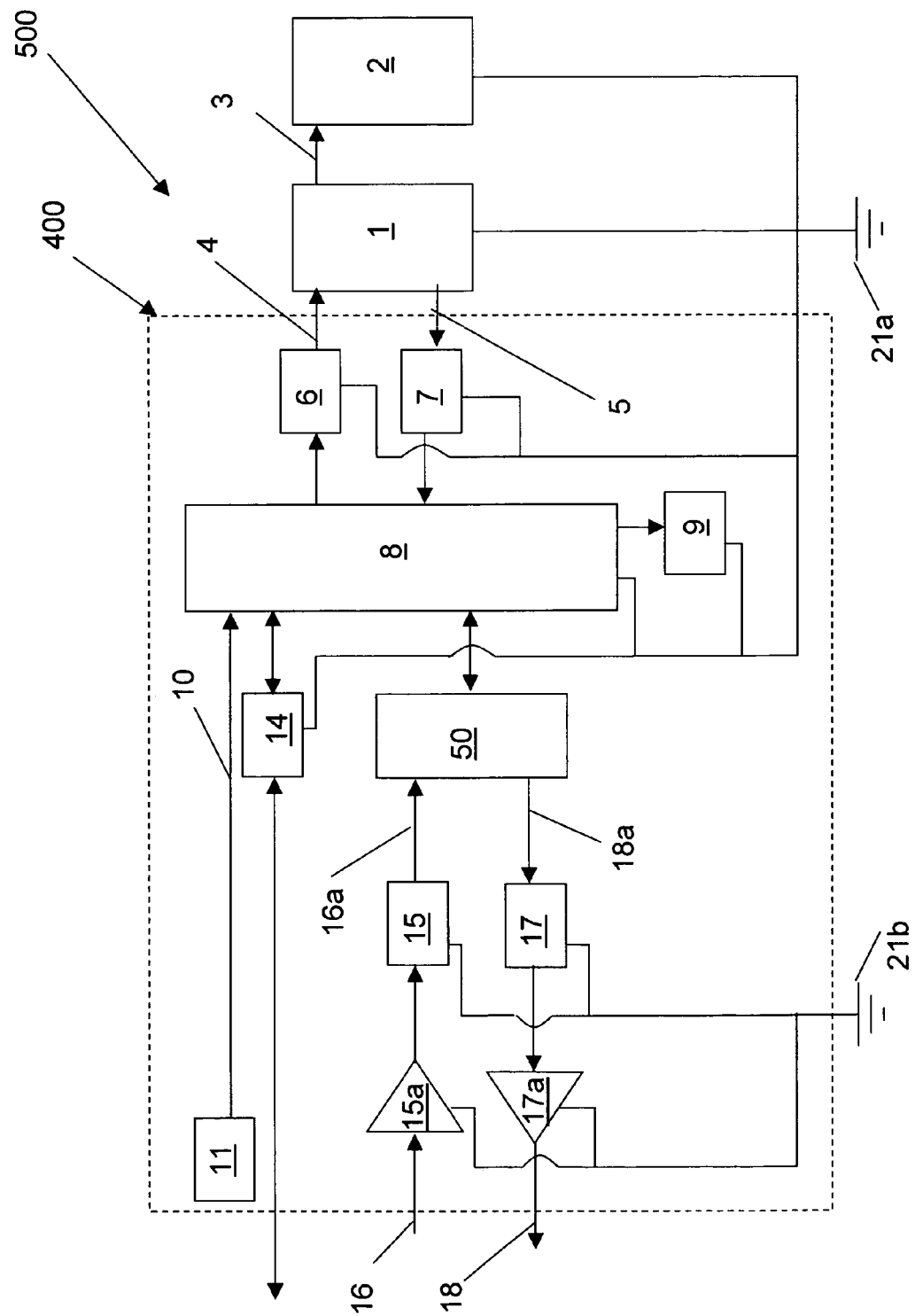
FIG. 3 illustrates a block diagram of an isolated digitally controlled power system, in accordance with another embodiment of the present invention.

In the exemplary embodiment of the invention as shown in FIG. 3, an isolated digital controlling device 400 comprises at least one analog to digital unit (ADC) 15, at least one Digital to Analog Converter (DAC) unit 6, a discrete signal isolator 50, and a digital micro-controller 8.

Isolated analog user input signal 16 is digitized by ADC 15. The isolated digital user input information 16a passes through a discrete signal isolator 50, to a micro-controller 8 which receives the digital information and as a response cause the DAC unit 6 to generate the analog signal necessary to adjust an adjustable power module 1 accordingly.

Optionally, several DAC units 6 are used to adjust several parameters of the power module 1.

Since the DAC unit is under the control of a micro-controller, a very flexible operation is possible. For example, discrete input signals could be applied to a discrete input line by programming DAC to produce the desired signal level. Additionally, micro-controller 8 may be equipped with digital outputs for providing binary discrete input signals to be connected to the power module.

Optionally, an electronic buffer is inserted between DAC 6 and input line 4. Optionally, said electronic buffer may be designed to match the requirements of input line 4 so as to change between bipolar and unipolar values. For example, electronic buffer may be used to boost the voltage of DAC unit 6 or to boost its ability to supply sufficient current to input line 4. Alternatively, said electronic buffer may translate the voltage produced by DAC unit 6 to appropriate current needed to dive a current mode analog input line. Optionally, electronic buffer may be used to translate binary signals from one standard to another.

Said electronic buffer is optionally comprised of operational amplifier and optionally configured with appropriate resistors. Optionally, several buffers are used for several lines 4.

Optionally, an electronic buffer 15a is used to condition analog user signal 16 before it arrives to ADC unit 15. An exemplary design for such electronic buffer 15a can be seen in FIG. 4a. Optionally, electronic buffer 15a may be designed to match the requirements of ADC 15 so as to change between bipolar and unipolar values. For example, electronic buffer 15a may be used to boost or reduce the signal 15 to match the voltage range of DAC 15 or to boost its ability to supply sufficient current to ADC 15. Alternatively, electronic buffer 15a may translate user analog signal from current to voltage or from resistance to voltage form or from bipolar signal to unipolar signal or combination of these translations. Electronic buffer 15a is optionally comprised of operational amplifier and optionally configured with appropriate resistors. Optionally, several buffers are used for several analog user inputs 16.

Optionally, an analog to digital converter (ADC) 7 is connected to an analog monitoring output line 5 of an adjustable module 1. In this exemplary embodiment, monitoring output signals produced by the adjustable module 1 are sampled and converted to digital values by the ADC unit 7. Micro-controller 8 receives the digital information indicative of the adjustable module statues and uses the information according to its programming. Optionally, several ADC units may be used to monitor several output lines.

Conversion of analog output signals to digital values may be done at regular intervals, according to the executed program or as a response to user command.

Binary or discrete-value output may be monitored by ADC unit and the digital values are interpreted by the micro-controller.

In some embodiments of the invention, monitoring the outputs is done at different intervals. For example, an output line indicating a fault in the power supply module may be monitored frequently, while an output line indicating the temperature may be monitored at less frequent intervals or as a response to a detection of fault.

Optionally, binary output lines may be connected directly to the micro-controller or through an electronic buffer.

Optionally, an electronic buffer may be inserted between analog input line 5 and ADC 7 to perform functions similar to that of buffer 15a.

Additionally or alternatively, an output DAC unit 17 could be used to produce isolated analog user output signal 18 for monitoring system operation. Analog user output signal 18 may be used by the user to monitor the operation of the isolated digitally controlled power system 500. Optionally, few DAC units may be used for few analog user output signals.

Digital information sent by micro-controller 8 passes through discrete signal isolator 50 as isolated digital user output 18a that operate DAC 17 to produce the desired user output signal 18.

Optionally, an electronic buffer 17a is used to condition analog signal produced by DAC 17 before it arrives to the user. An exemplary design for such electronic buffer 17a is shown in FIG. 4a. Optionally, electronic buffer 17a may be designed to match the requirements of user output signal 18 with output produced by DAC 17. For example, electronic buffer 17a may be used to change between bipolar and unipolar values. For example, electronic buffer 17a may be used to boost or boost the signal or to boost its ability to supply sufficient current. Alternatively, electronic buffer 17a may translate analog signal from voltage to current form or from unipolar signal to bipolar signal or combination of these translations. Electronic buffer 17a is optionally comprised of operational amplifier and optionally configured with appropriate resistors. En exemplary design for such electronic buffer 17a is shown in FIGS. 4a and b.

Optionally, voltage reference 30 (seen in FIG. 4) an exemplary use of such voltage reference is illustrated in FIG. 4.) is used to increase the accuracy of DAC or ADC units or both.

As indicated in FIG. 3, load common potential 21a is preferably used for all the electronics on the load side of bi-directional digital isolator 50 and is separated from isolated user common potential 21b.

In some embodiments of the present invention, the processing power needed to control and monitor the adjustable power supply module is relatively low. Thus, a suitable micro-controller can be selected from the list of commercially available micro-controllers or microprocessors. Alternatively, a field programmable gate array (FPGA) type of device could be programmed to perform the digital manipulation of data. Alternatively, a proprietary ASIC could be designed. The use of commercial micro-controller has an advantage of easy programming and available program editing and debugging tools.

The program needed for the operation of the isolated digital controlling device 400 is optionally stored in memory 9 connected to or integrated into micro-controller 8. The memory may be a hard-wired or factory installed ROM.

Optionally, the program could be modifiable by storing all or parts of the program in a modifiable memory such as flash memory, EPROM, or RAM.

User commands or programming instructions to isolated digital controlling device 400 may be digitally communicated with micro-controller 8 using one or more digital inputs. For example, one or more digital input devices 11 may be connected to micro-controller 8 via a digital input 10. Digital input device 11 may be in the form of a front panel such as a dial, keypad or a keyboard. Optionally, few digital input devices may be used.

Additionally or alternatively, micro-controller 8 may be capable of communicating through an input-output (I/O) 14. For example, a host computer may be used to supply the needed digital inputs and to receive outputs from micro-controller 8 through I/O 14. Additionally or alternatively I/O 14 may be a communication interface connected to micro-controller 8 to communicate both input to and outputs from the micro-controller. Any communication standard may optionally be used such as USB, RS232, GPIB, RS485, LAN or telephone modem, optical communication etc.

Alternatively or additionally, an isolated communication interface such as fiber optic communication device may be used to perform both communication and isolation functions.

In the exemplary embodiment of FIG. 3, only the user analog signals are isolated from load common potential 21a. This is done due to the sensitivity of analog signal to noise and susceptibility of analog circuits to damage. However, digital information exchanged between the user and micro-controller 8 may be isolated using a digital isolator.

Optionally, a proprietary ASIC could be designed so as to include several functions of isolated power system 300, isolated digital controlling device. 400 or isolated digitally controlled power system 500.

For example, the micro-controller and the memory could be manufactured as one integrated circuit (IC). Similarly, combinations of other functions could be integrated into one or few ICs. For example, mixed digital and analog IC may combine ADC and electronic buffer into one chip.

Isolated digitally controlled power system 500 may be integrated into a single compact circuit. Alternatively, isolated digital controlling device 400 could be designed and built as a separate circuit to be combined with or sold separately from the power module. It is apparent to a man skilled in the art that parts of isolated power system 300 isolated digital controlling device 400 or isolated digitally controlled power system 500 may be positioned in remote locations without changing their operation or degrade the system performance.

Programming micro-controller 8 allows great flexibility in the operation of isolated digitally controlled power system 500. The programmability of the micro-controller allows the user to develop various applications to meet his need without making any hardware modification and at low development cost.

Partial, non-limiting list of applications is given here to illustrate the usefulness of the invention.

The response constants of a power supply module can be adapted to the user standards by sampling and digitizing user analog control input signal 16 and generate analog input signal 4 that will cause the power supply module to produce the desire output. Similarly, a desired user analog output signal 18 can be produced by DAC 17 as a response to sampled analog monitoring output signal 5 after it was sampled by ADC 7 and manipulated by micro-controller 8.

A nonlinear response of adjustable module 1 can be corrected by calibration of the actual module response from direct measurements or modeling. The correction function is stored in memory 9 and is used by micro-controller 8 to achieve the desired output. Periodic calibration of the power supply (mandatory by regulation in many applications) can easily be done without hardware modification. Nonlinear behavior of analog monitoring output could be corrected similarly.

Digital feedback loop can be realized and closed by feeding error signals into the micro-controller through analog or digital inputs. For example, stabilization of the output voltage against large variations of load current can be achieved by sampling analog output signal proportional to the actual load voltage and programming the micro-controller to adjust the analog input signal that controls the output voltage accordingly. Sophisticated adaptive digital feedback loops algorithms can easily be programmed and improve the supply performance. As a consequence, controlled power supply system is easily adopted to be used in servo systems.

Arbitrary time varying waveforms could be produced by the system by proper programming. For example, sine wave at 50 Hz or 60 Hz could be produced and be used for electronic equipment testing.

The response of the system to detection of fault can be flexibly programmed. While simple short-protected power supplies simply shut down in response to current overload, the isolated digitally controlled power system 500 could be programmed to respond by shutting down momentarily and perform several attempts to restart operation. Optionally, the response of the system to interruption of normal operation or a detection of fault can be computed by the micro-controller taking into information about the history of the system operation stored in memory or the status of the system as, or status of external systems or combinations of these data.

Precisely controlled power ramp up at startup and power ramp down at shutdown could be programmed to prevent damage to the load. Similarly, power-up power-down sequence can be programmed in multi power output systems.

Several user defined or factory preinstalled set ups can be stored and selected by the user. For example, several combinations of voltage output and maximum current could be stored in memory and selected with a single simple command.

Figure 4B:
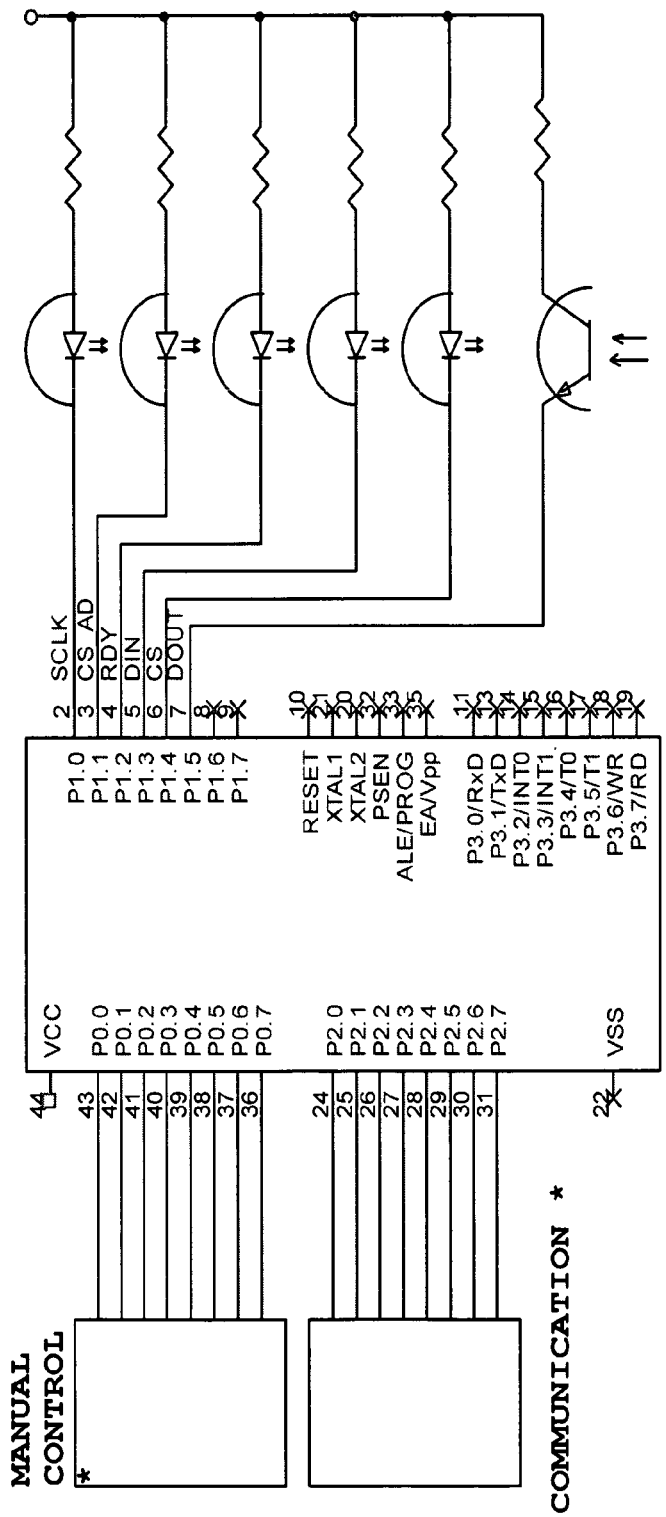
FIG. 4b depict some details of the part which is in the load common potential of the isolation and control device for an isolated, digitally controlled power system in accordance with an embodiment of the present invention.

Reference is now made to FIGS. 4a and 4b depicting some details of an isolated digital controlling device 400 in accordance with an exemplary embodiment of the present invention.

For clarity, FIG. 4a depict some details of the part which is in the isolated user common potential while FIG. 4b depict some details of the part which is in the load common potential of the of the isolation and control device.

In the exemplary illustration of the present invention, some details are given for an electronic design of a bi-directional digital isolator 50, for electronic buffers 15a and 17a, voltage reference 30 ADC 15 and 7 and DAC 6 and 7, micro-controller 8, digital input device 11, I/O interface 14, local DAC clock generator 90 and their connections.

The electronic circuit illustrated in FIGS. 4a and 4b generally follows the block diagram of isolated digital controlling device 400 as described in FIG. 3.

Micro-controller 8 receives user commands through front panel 11 or communication interface 14. In this exemplary embodiment of the invention, a P89C664HFA micro-controller is used. The micro-controller is isolated from the user analog signals by isolator 50 which transmits data to two DAC units 17, and receives data from one dual-input ADC unit 15. Electronic buffers 15a and 17a are located after the DAC units 17 and before the ADC unit 17 respectively.

Optional voltage reference 30 is used to increase the accuracy of the DAC 17 and ADC 15 units. Optionally, a separate voltage reference may be used to increase accuracy of other ADC and/or DAC units.

Four isolated analog user signals are thus provided: two isolated analog user input signals 16 and two isolated analog user output signals 18.

Control of the adjustable power supply module is affected by applying the analog input signal at the output of DAC 6 to the analog input lines 4 of adjustable module 1.

Similarly, monitoring the adjustable module 1 is done using a dual input ADC 7 which is connected to an analog monitoring output line 5 of adjustable module 1. Micro-controller 8 receives the digital information indicative of the adjustable module statues and uses the information according to its programming.

Optional electronic buffers 15a and 17a comprises an operational amplifier configured with optional resistors and optional capacitors. In this illustration, reconfiguring said buffers may be done by selecting the values of the passive components and/or removing some passive components.

In this exemplary design, the isolator 50 comprises six opto-couplers. One side of the isolator comprises five photo transmitters (LED's 71a, 72a, 73a, 74a, 75a) and one photo receiver (phototransistor 76b), while the other side of the isolator includes five photo receivers (phototransistors 71b, 72b, 73b, 74b, 75b) and one photo transmitter (LED 76a).

Opto-coupler 71 (comprising LED 71a and photo transistor 71b) is used for synchronization of DACs 17 and ADC 15 to micro-controller 8 by transmitting clock signal from the micro-controller to the DAC and ADC units. Opto-coupler 72 is used to select the ADC unit and instructs it to transmit data to the micro-controller. Opto-coupler 73 is used by the micro-controller to indicate to the ADC 15 which one of its two inputs to sample. Opto-coupler 74 is used to transmit data from micro-controller 8 to both DAC 17 and ADC 15. Said data is used by ADC 15 to configure its operation and by DAC 17 to produce the analog signal. Data from opto-coupler 74 enters the first DAC 17 and passes through it to the second DAC. Opto-coupler 75 selects the two DAC units 17 to be activated and respond to data from opto-coupler 74. Opto-coupler 76 is used for transmission of data from ADC 15 to micro-controller 8 indicative of the digitized analog output voltages.

Parts of system 400 that are shown in FIG. 4b are at the load common potential 21a, while the rest of system 400 shown in FIG. 4a is in the isolated user common potential 21b.

A local DAC clock generator 90 is used by the ADC unit 15 for its internal operation. ADC unit 7 receives its local clock from micro-controller 8. It was found to be easier to generate the local clock separately at the isolated section of the circuit then transmitting it through a binary isolator.

Figure 5:
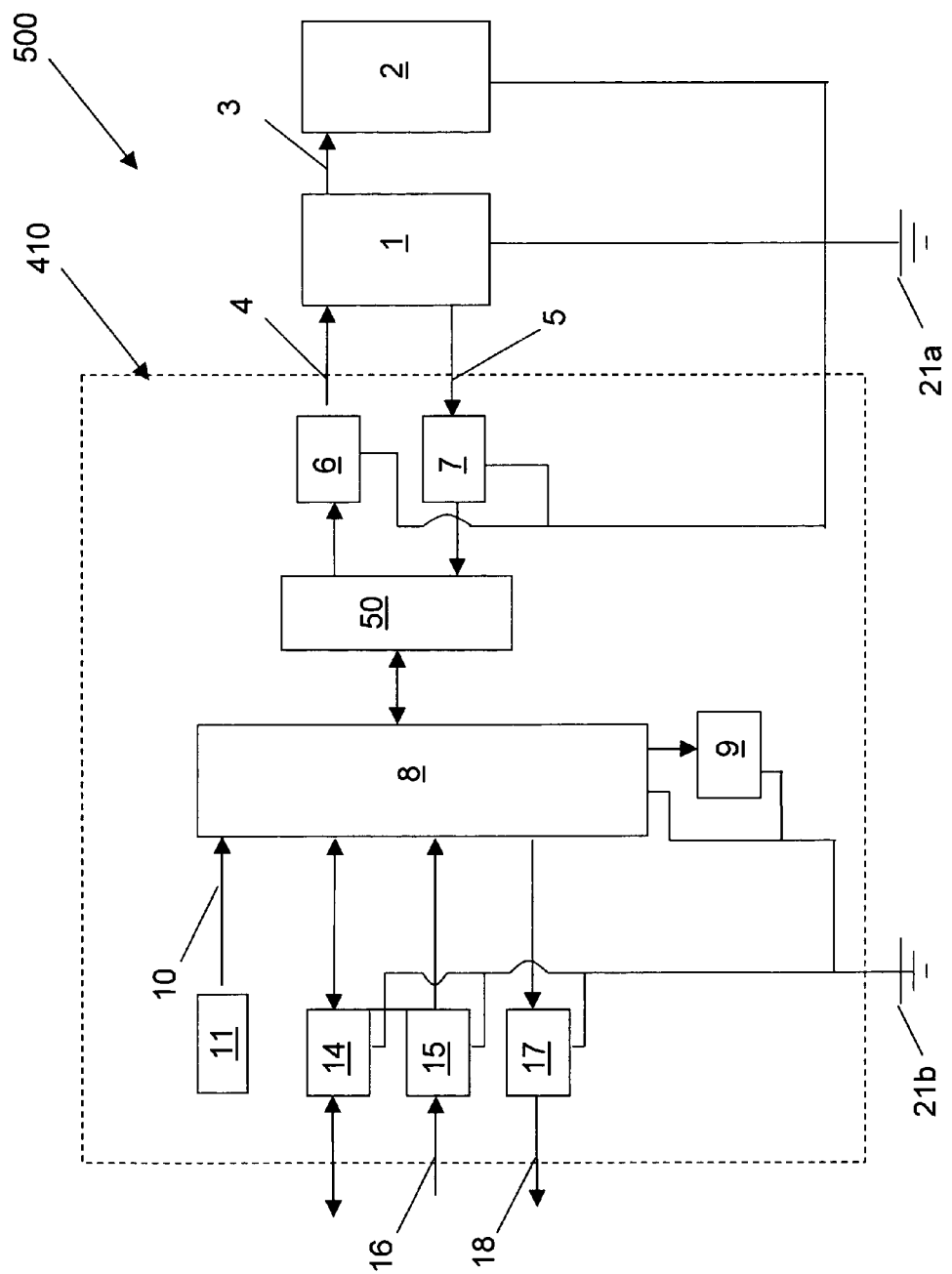
FIG. 5 illustrates a block diagram of an isolated digitally controlled power system, in accordance with yet another embodiment of the present invention.

Reference is now made to FIG. 5 illustrating a block diagram of an isolated digital controlling device 410 and isolated digitally controlled power system 500, in accordance with yet another embodiment of the present invention.

In this exemplary embodiment of the invention, DAC 6 and optional ADC 7 are at load common potential 21a. The rest of the components shown in FIG. 5 of isolated digital controlling device 410 are on the isolated user common potential 21b of the discrete signal isolator 50.

In the exemplary embodiment of the invention as shown in FIG. 5, an isolated digital controlling device 410 comprises at least one analog to digital unit (ADC) 15, at least one Digital to Analog Converter (DAC) unit 6, a discrete signal isolator 50, and a digital micro-controller 8.

Isolated analog user input signal 16 is digitized by ADC 15. The isolated digital user input information passes to micro-controller 8 that receives the isolated digital information and as a response sends digital information through digital isolator 50 to cause the DAC unit 6 to generate the analog signal necessary to adjust an adjustable power module 1 accordingly.

Optionally, several DAC units 6 are used to adjust several parameters of adjustable module 1.

Additionally, micro-controller 8 may be equipped with digital outputs for providing binary discrete input signals to be connected to the power module through a digital isolator.

Optionally, an electronic buffer is inserted between DAC 6 and input line 4.

Optionally, said electronic buffer may be designed to match the requirements of input line 4. Optionally, several buffers are used for several lines 4.

Optionally, an electronic buffer is used to condition analog user signal 16 before it arrives to ADC unit 15. Optionally, an analog to digital converter (ADC) 7 is connected to an analog monitoring output line 5 of adjustable module 1. In this exemplary embodiment, monitoring output signals produced by the power module are sampled and converted to digital values by the ADC unit 7. Micro-controller 8 receives, through digital isolator 50, the digital information indicative of the adjustable module statues and uses the information according to its programming. Optionally, several ADC units may be used to monitor several output lines.

Optionally, binary output lines may be connected through digital isolator to the micro-controller.

Optionally, an electronic buffer may be inserted between analog input line 5 and ADC 7.

Additionally or alternatively, an output DAC unit 17 could be used to produce isolated analog user output signal 18 for monitoring system operation. Analog user output signal 18 may be used by the user to monitor the operation of isolated digitally controlled power system 500. Optionally, few DAC units may be used for few analog user output signals.

Optionally, an electronic buffer is used to condition analog signal produced by DAC 17 before it arrives to the user.

Optionally, voltage reference is used to increase the accuracy of DAC or ADC units or both.

As indicated in FIG. 5, the load common potential 21*a* is preferably used for all the electronics on the load side of bi-directional digital isolator 50 and is separated from isolated user common potential 21*b*.

User commands to isolated digital controlling device 410 are digitally communicating with micro-controller 8 using one or more digital inputs. For example, one or more digital input devices 11 may be connected to micro-controller 8 via digital input 10. Digital input device 11 may be in the form of a front panel such as a dial, keypad or a keyboard. Optionally few digital input devices may be used.

Additionally or alternatively, micro-controller 8 is capable of communicating through an input-output (I/O) 14.

While the invention has been described with reference to certain exemplary embodiments, various modifications will be readily apparent to and may be readily accomplished by persons skilled in the art without departing from the spirit and scope of the above teachings.

It should be understood that features and/or steps described with respect to one embodiment may be used with other embodiments and that not all embodiments of the invention have all of the features and/or steps shown in a particular figure or described with respect to one of the embodiments. Variations of embodiments described will occur to persons of the art.

It is noted that some of the above described embodiments may describe the best mode contemplated by the inventors and therefore include structure, acts or details of structures and acts that may not be essential to the invention and which are described as examples. Structure and acts described herein are replaceable by equivalents which perform the same function, even if the structure or acts are different, as known in the art. Therefore, the scope of the invention is limited only by the elements and limitations as used in the claims. The terms "comprise", "include" and their conjugates as used herein mean "include but are not necessarily limited to".

What is claimed is:

1. An isolated digital controlling device for controlling adjustable module, said isolated device comprising:

at least one user analog input line for receiving user input signal for adjusting a working parameter of the adjustable module;

at least one analog to digital converter receiving said user analog input signal and converting said user analog input signal to digital input information;

at least one discrete-value isolator receiving said digital input information from said analog to digital converter and transmitting an isolated digital information;

a micro-controller adapted to receive said isolated digital information from said discrete-value isolator and produce isolated processed digital input information in response to said isolated digital input information;

at least one digital to analog converter unit receiving said isolated processed digital input information and producing analog input signal for controlling at least one adjustable module.

2. An isolated digital controlling device according to claim 1, further comprising:

at least one analog to digital converter receiving analog monitoring output signal from adjustable module and converting said analog monitoring output signal to digital output information and transmitting said digital output information to said micro-controller.

3. An isolated digital controlling device according to claim 2, further comprising:

at least one discrete-value isolator receiving processed digital output information from said micro-controller and transmitting isolated processed digital output data to a digital to analog converter;

at least one digital to analog converter receiving said isolated processed digital output data and producing at least one user analog monitoring output signal.

4. An isolated digital controlling device according to claim 3 wherein the discrete-value isolator is a bi-directional isolator.

5. The isolated digital controlling device according to claim 2 wherein the accuracy of user analog monitoring output signal is better then 0.5%.

6. An isolated digital controlling device according to claim 1 wherein the discrete-value isolator comprises at least one opto-coupler.

7. An isolated digital controlling device according to claim 1, further comprising:

at least one digital input device transmitting at least one user command to said micro-controller.

8. An isolated digital controlling device according to claim 7, wherein program executed by said micro-controller could be modified in response to at least one user command received from digital input device.

9. An isolated digital controlling device according to claim 1, further comprising:

at least one communication interface transmitting digital information to said micro-controller and receiving digital information from said micro-controller.

10. An isolated digital controlling device according to claim 9, wherein program executed by said micro-controller could be modified in response to digital information received from said communication interface.

11. The isolated digital controlling device according to claim 1 wherein the accuracy of user analog input signal is better then 0.5%.

12. An isolated digital controlling device for controlling adjustable module comprising:

at least one user analog input line for receiving user input signal for adjusting a working parameter of adjustable module;

at least one analog to digital converter receiving said user analog input signal and converting said user signal to digital input information;

a micro-controller adapted to receive information from said analog to digital converter and produce processed digital input information in response to said digital input information;

at least one discrete-value isolator receiving said processed digital input information from said micro-controller and transmitting said isolated information to at least one digital to analog converter;

at least one digital to analog converter unit receiving said isolated processed digital input information and producing analog signal for controlling adjustable module.

13. An isolated digital controlling device according to claim 12, further comprising:
- at least another analog to digital converter receiving analog monitoring output signal from adjustable module and converting said analog monitoring output signal to digital output information and transmitting said digital output information to at least one discrete-value isolator;
- at least one discrete-value isolator receiving digital output information from said digital to analog converter and transmitting isolated digital output data to said micro-controller;

14. The isolated digital controlling device according to claim 13, wherein the accuracy of user analog monitoring output signal is better then 0.5%.

15. An isolated digital controlling device according to claim 13, further comprising:
- at least one digital to analog converter receiving processed digital output data from said micro-controller and producing at least one user analog monitoring output signal.

16. The isolated digital controlling device according to claim 12, wherein the accuracy of user analog input signal is better then 0.5%.

17. An isolated adjustable power system with analog user input line electrically isolated from adjustable power module circuit, said isolated power system comprising:
- at least one user analog input line for receiving user input signal for adjusting working parameter of adjustable power module;
- at least one analog to digital converter receiving user analog input signal and converting said user signal to digital input information;
- at least one discrete-value isolator receiving said digital input information from said analog to digital converter and transmitting said isolated information to un-isolated power module side;
- at least one digital to analog converter receiving isolated digital information from said isolator and producing analog input signal;
- at least one adjustable power module capable of adjusting at least one working parameter in response to said analog input.

18. The isolated adjustable power system according to claim 17, further comprising:
- an analog monitoring output signal indicating the status of said adjustable module;
- at least another analog to digital converter receiving analog output signal from said adjustable module and converting said analog monitoring signal to digital output information;
- at least one discrete-value isolator receiving said digital output information from said analog to digital converter and transmitting said digital information to isolated user side;
- at least another digital to analog converter receiving digital information from isolator and producing user analog monitoring output signal.

19. The isolated adjustable power system according to claim 18, wherein discrete-value isolator is a bi-directional isolator.

20. The isolated adjustable power system according to claim 17 wherein the accuracy of user analog input signal is better then 0.5%.

* * * * *